3,594,373
BASES OF 2-ANILINOBENZOXAZOLES AND
PROCESS FOR MAKING THEM
Francis Frederick Stephens and Christopher James Sharpe,
London, England, assignors to Twyford Laboratories
Limited
No Drawing. Filed Mar. 11, 1968, Ser. No. 711,866
Claims priority, application Great Britain, Mar. 20, 1967,
12,843/67
Int. Cl. C07d 89/32, 29/18, 99/00
U.S. Cl. 260—247.5
15 Claims

ABSTRACT OF THE DISCLOSURE

Nitrogen bases of alkoxy-substituted anilinobenzoxazoles and the salts of these bases with physiologically acceptable acids, having utility as anti-depressive agents, are disclosed. These bases may be prepared by condensing a 2-halogeno- or 2-mercaptobenzoxazole with an aniline compound having an appropriately substituted alkoxy group in the para-position. The nitrogen base group may be present as the substituent on the alkoxy group before the condensation reaction or may be added as a separate step.

---

This invention relates to new anilinobenzoxazoles and has particular reference to pharmacologically active anilinobenzoxazole basic ethers and related compounds.

The new compounds provided by this invention display pharmacological properties consistent with their therapeutic value as anti-depressive agents. Thus, in pharmacological screening tests the compounds of this invention, when administered to laboratory animals in non-toxic doses by the oral or systemic route, are shown to possess anti-convulsant properties, anti-cholinergic properties, to potentiate the central action of amphetamine and to reverse the effects of reserpine.

Accordingly the present invention provides novel bases of 2-anilinobenzoxazoles possessing the general formula:

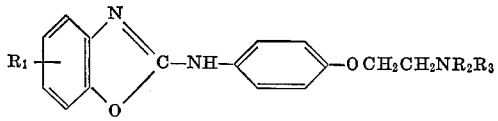

(I)

where $R_1$ represents hydrogen, halogen or a lower alkyl group containing up to 4 carbon atoms, and $R_2$ and $R_3$ may be the same or different groups chosen from lower alkyl groups containing up to 4 carbon atoms, or $NR_2R_3$ may represent a heterocyclic ring such as piperidine, morpholine or pyrrolidine. The substituent $R_1$ should preferably be in the 5 or 6-position of the benzoxazole ring. Furthermore this invention includes salts of these basic compounds such as are formed from physiologically acceptable acids as for example hydrochloric acid, citric acid or tartaric acid.

The present invention also provides pharmaceutical preparations of the biologically active anilinobenzoxazoles in admixture with one or more solid or liquid therapeutically acceptable inert carriers.

The anilinobenzoxazoles of this invention may be prepared by the condensation of an appropriately substituted aniline with a 2-halogenobenzoxazole.

This condensation may be effected by reaction of equimolecular amounts of the corresponding substituted aniline and the 2-halogenobenzoxazole in refluxing dimethyl formamide solution or preferably in tetrachlorethane.

If desired 4-($\beta$-chloroethoxy) aniline may be employed as the appropriately substituted aniline and reacted with the 2-halogenobenzoxazole. The resulting 2-[4-($\beta$-chloroethoxy)anilino]benzoxazole is then reacted with the appropriate secondary amine to give the desired anilinobenzoxazole of the invention. Alternatively the desired anilinobenzoxazoles may be prepared by reacting a substituted mercaptobenzoxazole with an appropriately substituted aniline, such condensations being effected in a high boiling organic solvent such as ortho- or para-dichlorobenzene.

Such bases, as are prepared by these and other methods and possessing the general Formula I above, may be converted into salts by reaction with common inorganic or organic acids.

Following is a description by way of example of methods of carrying the invention into effect.

EXAMPLE 1

2-[4-(2-diethylaminoethoxy)anilino]benzoxazole 2-chlorobenzoxazole (3 g.), p-diethylaminoethoxyaniline (3.76 g.) and dry dimethylformamide (10 ml.) are boiled under reflux for 6 hours. The cooled solution is made alkaline with 40% sodium hydroxide solution and extracted with ether. The dried (MgSO$_4$) ether solution is passed through a column of alumina and evaporated to leave a brown oil which crystallises from light-petroleum, B.P. 60–80° C., giving 2-[4-(2-diethylaminoethoxy)anilino]benzoxazole (4.65 g.) as a white solid, M.P. 73–74° C.

EXAMPLE 2

2-[4-(2-N-piperidinoethoxy)anilino]-benzoxazole 2-chlorobenzoxazole (4.57 g.), p-piperidinoethoxyaniline (6.55 g.) and dry dimethylformamide (30 ml.) are boiled under reflux for 6 hours. The cooled solution is poured into 500 ml. of 2 N-hydrochloric acid and the solution is made strongly alkaline by addition of concentrated sodium hydroxide solution. The brown gum obtained by extraction with ethyl acetate is chromatographed on a column of alumina (300 g.). After development of the column with benzene the product is obtained by elution with a mixture of chloroform (1 pt.) and benzene (4 pts.) and recrystallised two or more times from ethylene acetate to give 2-[4-(2-N-piperidinoethoxy)anilino]-benzoxazole, M.P. 129–130° C.

EXAMPLE 3

2-[4-($\beta$-chloroethoxy)anilino]benzoxazole 4-($\beta$-chloroethoxy)aniline (2.5 g.) and 2-chlorobenzoxazole (2.4 g.) in sym-tetrachloroethane (30 ml.) are boiled under reflux for 3 hours, cooled, diluted with chloroform, washed with saturated sodium bicarbonate solution and with water, dried (MgSO$_4$) and evaporated on the water-bath, finally at reduced pressure. The residue is recrystallised from benzene to obtain 3.46 g. (77%) of white solid, M.P. 165–167° C.

EXAMPLE 4

2-[4-($\beta$-piperidinoethoxy)anilino]benzoxazole

2-[4-($\beta$-chloroethoxy)anilino]benzoxazole (20 g.), piperidine (23 ml.) and toluene (80 ml.) are boiled under reflux for 6 hours, cooled and extracted with 2 N hydrochloric acid. The acid solution is washed with ether, made alkaline with 40% sodium hydroxide solution and the oily product extracted into ether. The washed (water) and dried (MgSO$_4$) ether solution is evaporated and the residue recrystallised from ethyl acetate to give cream leaflets (13.4 g.; 57%), M.P. 131–132° C.

EXAMPLE 5

2-[4-($\beta$-pyrrolidinoethoxy)anilino]benzoxazole

2-[4-($\beta$-chloroethoxy)anilino]benzoxazole (2.9 g.), pyrrolidine (2.13 g.) and toluene (20 ml.) react under the conditions described in Example 4 to give white needles (1.5 g.; 50%), M.P. 128.5° C., after two recrystallisations from ethyl acetate.

EXAMPLE 6

2-[4-(β-morpholinoethoxy)anilino]benzoxazole

2-[4-(β-chloroethoxy)anilino]benzoxazole (5.8 g.), morpholine (5.22 g.), sodium iodide (0.2 g.) and toluene (20 ml.) are boiled under reflux for 12 hours. A further portion of morpholine (5.2 g.) is then added and boiling continued for a further 8 hours. The crude product, obtained by the procedure used in Example 4, is a gum which gives a brown solid (3.8 g.) by trituration with light-petroleum. Two recrystallisations from ethyl acetate give white plates (3.3 g.; 48%), M.P. 160–161° C.

EXAMPLE 7

2-[4-(β-dimethylaminoethoxy)anilino]benzoxazole

A mixture of 2-[4-(β-chloroethoxy)anilino]benzoxazole (2.9 g.), sodium iodide (0.2 g.) and ethyl methyl ketone (30 ml.) is cooled below 0° C. and liquid dimethylamine (30 ml.) is added. The resulting solution is heated in a sealed stainless steel vessel at 90° C. for about 20 hours. The solution is evaporated to dryness and the residue dissolved in 2 N hydrochloric acid and washed with ether. The acid solution is made alkaline with 40% sodium hydroxide solution and extracted with several portions of ether. The ether solution is washed with water, dried (MgSO₄) and concentrated to about 10 ml. and the product (2.3 g.) precipitated by addition of light-petroleum (B.P. 40–60° C.). Recrystallisation from ethyl acetate and then from light-petroleum (B.P. 60–80° C.) gives white flakes (2.1 g.; 70%), M.P. 106.5–107° C.

EXAMPLE 8

2-[4-(β-diethylaminoethoxy)anilino]-6-methylbenzoxazole 2-amino-5-methylphenol (24.6 g.), ethyl potassium xanthate (32 g.) 95% ethanol (180 ml.) and water (27 ml.) are boiled under reflux for 3 hours, the hot solution mixed with charcoal and filtered. The filtrate is diluted with about 180 mls. of water and acidified with acetic acid (15 ml.) to obtain 2-mercapto-6-methylbenzoxazole (24.9 g.), M.P. 211–212° C.

A solution of 2-mercapto-6-methylbenzoxazole (3.3 g.) and 4-(β-diethylaminoethoxy)aniline in o-dichlorobenzene (20 ml.) is boiled under reflux for about 24 hours. The cooled solution is diluted with ether and extracted with 2 N hydrochloric acid. The acid solution is made basic with sodium carbonate, extracted with ether, washed with water dried (MgSO₄) and evaporated to give a dark oil. This is partially purified by passing a chloroform solution through a column of alumina and eluting with chloroform. The product so obtained is further purified by chromatography on a column of silica gel from which the desired product is obtained by elution with acetone. Recrystallisation of the product from benzene or from light-petroleum B.P. 80–100° C. gives colourless prisms (1.1 g.), M.P. 97–98° C. The compound can also be obtained as plates, M.P. 85–85.5° C., from light-petroleum B.P. 60–80° C.; the infra-red spectra of the two forms in carbon tetrachloride solution are identical.

EXAMPLE 9

5-chloro-2-[4-β(diethylaminoethoxy)anilino]benzoxazole

A solution of 2,5-dichlorobenzoxazole (0.93 g.) and 4-(β-diethylaminoethoxy)aniline (1.04 g.) in sym-tetrachloroethane (10 ml.) is boiled under reflux for 3 hours. The solvent is evaporated at reduced pressure and the residual oil dissolved in 2 N hydrochloric acid, washed with ether and made alkaline with 40% sodium hydroxide solution. The liberated base is extracted into ether, washed with water, dried (MgSO₄) and evaporated and the residual solid (1.4 g.) is recrystallised from a mixture of benzene and n-hexane to give a colourless product (1 g.), M.P. 117–118° C.

EXAMPLE 10

2-[4-(β-diethylaminoethoxy)anilino]-5-methylbenzoxazole 2-mercapto-5-methylbenzoxazole (4.95 g.) and 4-(β-diethylaminoethoxy)aniline (6.18 g.) reacted by the process described in Example 8 give the 5-methyl isomer (3.4 g.) M.P. 106–107° C., after one or more recrystallisations from light-petroleum, B.P. 80–100° C.

EXAMPLE 11

6-chloro-2-[4-(β-diethylaminoethoxy)anilino]benzoxazole

A mixture of 6-chloro-2-mercaptobenzoxazole (3.61 g.), 4-(β-diethylaminoethoxy)aniline (4.16 g.) and p-dichlorobenzene (20 g.) is boiled under reflux for 16 hours. The cooled mixtunre is dissolved in ether and extracted with 2 N hydrochloric acid. The acid solution is made alkaline with 40% sodium hydroxide solution, extracted with ether and the washed (water) and dried (MgSO₄) ether solution is evaporated to obtain a brown oil (5.2 g.). The product is recrystallised from n-hexane to obtain a pink solid (3.2 g.) which is further purified by chromatography on a column of alumina (120 g.) from which the product is eluted with mixtures of chloroform and benzene in which the chloroform concentration is increased stepwise from 10% to 70%. The residue obtained by evaporation of the chloroform benzene eluate is recrystallised from n-hexane to give a colourless solid (2.8 g.), M.P. 100–101° C.

We claim:

1. A compound selected from the group consisting of 2-anilinobenzoxazoles of the formula

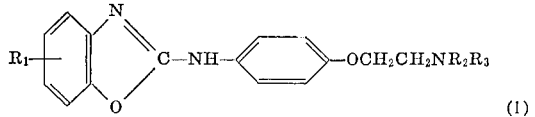

(1)

where $R_1$ represents hydrogen, halogen or a lower alkyl group containing up to 4 carbon atoms, and $R_2$ and $R_3$ may be the same or different groups chosen from lower alkyl groups containing up to 4 carbon atoms, or $NR_2R_3$ may represent a piperidino, morpholino or pyrrolidino group; and the salts of said compounds formed from physiologically acceptable acids.

2. 2-[4-(2-diethylaminoethoxy)anilino] benzoxazole.
3. 2-[4-(2-N-piperidinoethoxy)anilino]-benzoxazole.
4. 2-[4-(β-chloroethoxy)anilino]benzoxazole.
5. 2-[4-(β-pyrrolidinoethoxy)anilino]benzoxazole.
6. 2-[4-(β-morpholinoethoxy)anilino]benzoxazole.
7. 2-[4-(β-diethylaminoethoxy)anilino]benzoxazole.
8. 2-[4-(β-diethylaminoethoxy)anilino]-6-methylbenzoxazole.
9. 5-chloro-2-[4-(β-diethylaminoethoxy)anilino]-benzoxazole.
10. 2-[4-(β-diethylaminoethoxy)anilino]-5-methylbenzoxazole.
11. 6-chloro-2-[4-(β-diethylaminoethoxy)anilino]-benzoxazole.

12. A process for the preparation of bases of 2-anilinobenzoxazoles of the formula

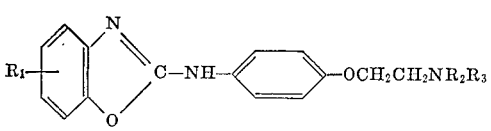

where $R_1$ represents hydrogen, halogen or a lower alkyl group containing up to 4 carbon atoms, and $R_2$ and $R_3$ may be the same or different groups chosen from lower alkyl groups containing up to 4 carbon atoms, or $NR_2R_3$ may represent a piperidino, morpholino or pyrrolidino group which process comprises condensing a 2-halogeno-benzoxazole with 4-(β-chloroethoxy) aniline and then reacting the resulting 2-[4-(β-chloroethoxy)anilino] benzoxazole with the appropriate secondary amine to give the selected anilino-benzoxazole compound of said formula.

13. A process as claimed in claim 12 wherein equimolecular amounts of the aniline compound and 2-halogeno-benzoxazole are reacted in refluxing dimethyl formamide solution or tetrachlorethane.

14. A process for the preparation of bases of 2-anilino-benzoxazoles having the general formula

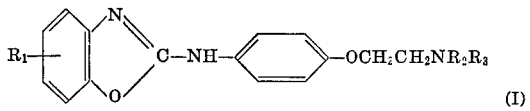

(I)

where $R_1$ represents hydrogen, halogen or a lower alkyl group containing up to 4 carbon atoms, and $R_2$ and $R_3$ may be the same or different groups chosen from lower alkyl groups containing up to 4 carbon atoms, or $NR_2R_3$ may represent a piperidino, morpholino or pyrrolidino group, which process comprises reacting a substituted mercaptobenzoxazole with an appropriate substituted aniline.

15. A process as claimed in claim 8 wherein the reaction is effected in the presence of ortho- or para-dichlorobenzene.

References Cited
UNITED STATES PATENTS 3,457,281  7/1969  Green et al. _____ 260—346.2

ALEX MAZEL, Primary Examiner

B. I. DENTZ, Assistant Examiner

U.S. Cl. X.R.

260—307, 294.7; 424—267, 272, 248